United States Patent
Cook, II

(10) Patent No.: US 6,716,520 B2
(45) Date of Patent: Apr. 6, 2004

(54) STRUCTURAL REFLECTIVE INSULATING MATERIAL FOR DUCTS AND OTHER PURPOSES

(76) Inventor: Elmer L. Cook, II, 2043 Palm Harbour Dr., Ft. Walton Beach, FL (US) 32547

( * ) Notice: Subject to any disclaimer, the term of this patent is extended or adjusted under 35 U.S.C. 154(b) by 0 days.

(21) Appl. No.: 09/898,694

(22) Filed: Jul. 3, 2001

(65) Prior Publication Data

US 2003/0012944 A1 Jan. 16, 2003

(51) Int. Cl.$^7$ .............................. B32B 3/26; D03D 9/00
(52) U.S. Cl. ................................ 428/314.4; 428/317.1; 428/319.1; 428/36.5; 442/6; 442/9; 442/16; 442/30; 442/38; 156/217; 156/218; 156/226; 156/227; 156/324
(58) Field of Search ................................. 442/9, 16, 30, 442/38, 6; 428/36.5, 317.1, 319.1, 314.4; 156/217, 218, 226, 227, 324

(56) References Cited

U.S. PATENT DOCUMENTS

| | | | | |
|---|---|---|---|---|
| 3,607,531 A | * | 9/1971 | Small et al. ................ | 156/251 |
| 4,037,751 A | * | 7/1977 | Miller et al. ................ | 428/593 |
| 4,049,852 A | * | 9/1977 | Smith et al. ................ | 156/251 |
| 4,468,431 A | * | 8/1984 | Okey ........................... | 428/55 |
| 4,522,165 A | * | 6/1985 | Ogawa ...................... | 428/317.7 |
| 4,584,232 A | * | 4/1986 | Frank et al. .................. | 442/30 |
| 5,316,835 A | | 5/1994 | Groft et al. | |
| 6,119,465 A | * | 9/2000 | Mullens et al. ................ | 62/60 |

* cited by examiner

Primary Examiner—Daniel Zirker
Assistant Examiner—Hai Vo
(74) Attorney, Agent, or Firm—Edward M. Livingston

(57) ABSTRACT

A reflective insulating material (1) with sufficient structural integrity to form and maintain a configuration of air ducts (9, 13), boxes and other structures having outer layers of reflective foil (2, 8), multiple inner layers of foam material (4, 6) and a mesh material (5) sandwiched between the layers of foam material, all adhered together by adhesive and heat. The material can be configured end to end and secured by tape (11, 18) to form air ducts (9, 13) or other structures. An optional hook lock (15, 16) is provided to help secure ends when forming substantially circular air ducts (13).

22 Claims, 1 Drawing Sheet

STRUCTURAL REFLECTIVE INSULATING MATERIAL FOR DUCTS AND OTHER PURPOSES

BACKGROUND OF THE INVENTION

This invention relates to insulating materials and more particularly to a reflective insulating material with sufficient structural integrity to form air ducts for heating, ventilating and air conditioning ("HVAC") systems, boxes, belly boards and other items requiring insulation along with structural integrity.

Currently, most HVAC ducts are made of metal or fiberglass with an inside liner of fiberglass or other insulation material. Although fiberglass is an insulator, it is not very effective in reducing temperature increase in air conditioning systems or temperature loss in heating systems as air moves through the air ducts. Also, fiberglass coating causes resistance to air flow, thereby requiring larger air ducts to move sufficient quantities of cooling or heating air to rooms in an occupied structure. Even perhaps worse is that the fiberglass breaks down with age and small glass fibers are disbursed into the air stream and breathed by people, a potentially serious health hazard. Even furthermore, HVAC ducts made of metal or fiberglass duct board are difficult and more costly to form air structures as it must be cut in sections in order to be used, which is time consuming and disrupts the fiberglass coating and disburses fiberglass particles into the airways. Also, fiberglass presents a further health hazard due to its water trapping characteristics which fosters the growth of mold, mildew and fungus and results in breakdown and collapse when it is allowed to stay wet for long periods.

Thus, a need exists for an insulating material with structural integrity that can be used to form HVAC ducts and other structural items which eliminates the above problems.

The most pertinent prior art is disclosed in U.S. Pat. No. 5,316,835 issued to Groft, et al. on May 31, 1994. Groft, et al. discloses an insulating material and discusses the benefits of its use as an insulating material and as a liner for air conditioning ducts and other items. However, Groft, et al. does not provide a material with the structural strength necessary to form and maintain configurations for air conditioning ducts, boxes, belly boards, coolers and other items.

On the other hand, the present invention provides a structural reflective insulating material having metal mesh material embedded between foam layers, preferably closed cell polyethylene foam or the equivalent, and wrapped in layers of metal foil on the outside.

SUMMARY OF THE INVENTION

The primary object of the present invention is to provide a reflective or radiant insulating material with sufficient structural integrity to form and maintain configurations required for air ducts or other structural items.

Another object of the present invention is to provide a duct made from insulating material which conserves energy.

A further object of the present invention is to provide an air duct which reduces the temperature changes of the air in the duct along an entire length of the duct.

An even further object of the present invention is to provide safer air ducts by eliminating the use of fiberglass as an insulating material.

Another further object of the present invention is to provide an air duct system that is waterproof.

An additional object of the present invention is to provide an air duct which reduces the noise level associated with current ducts.

An even further additional object of the present invention is to provide air ducts that are easier and less expensive to manufacture.

The present invention fulfills the above and other objects by providing an insulating material consisting of multiple layers of different materials. The multiple layers include a first outer layer of reflective foil which is bound to a first layer of foam material by an adhesive binding coating material. At least one layer of mesh material is sandwiched between the first layer of foam material and a second layer of foam material.

Finally, a second layer of reflective foil is attached to the second layer of foam material by an adhesive binding material. The reflective foil is preferably made of metal such as aluminum. The layers of foam material are preferably polyethylene foam of the closed cell variety. The adhesive binding material may be a polyurethane adhesive. The mesh material may be made of almost any metal, preferably galvanized steel or aluminum in order to prevent corrosion. The structural reflective insulating material may be used to form an air duct used in HVAC systems by shaping the piece of material as many times as necessary so the ends of the piece form a channel with the ends being secured together by metallic tape or other means. The air ducts may be substantially rectangular, circular, or any other shape deemed necessary. The ends of a substantially circular duct may be further secured by interconnected curved hooks on contact ends of the material.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
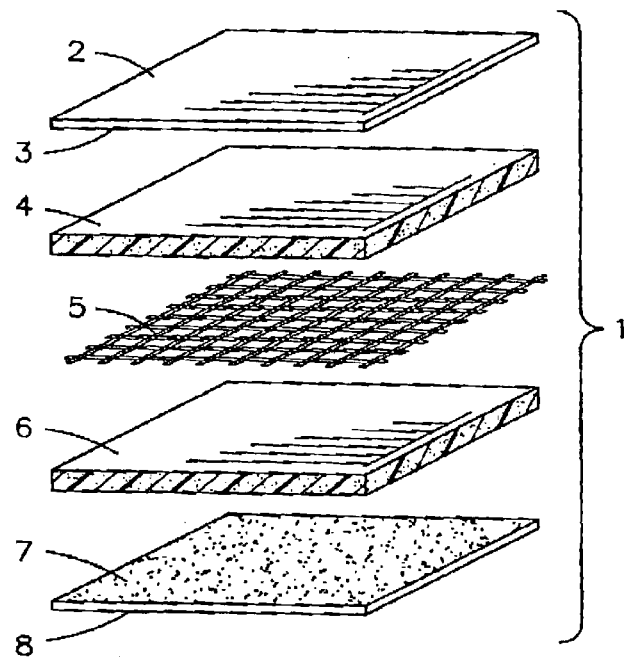
FIG. 1 is an exploded perspective view of the invention showing the layers of the structural reflective insulating material.

For purposes of describing the preferred embodiment, the terminology used in reference to the numbered components in the drawings is as follows:

1. reflective insulating material
2. outer layer of metal foil
3. binding/adhesive coating
4. foam material
5. mesh material
6. foam material -continued 7. binding/adhesive coating
8. inner layer of metal foil
9. square HVAC duct
10. corner juncture
11. tape
12. air channel
13. circular duct
14. taped end
15. inward curved
16. outward curved
17. air channel
18. tape As illustrated in FIG. 1 a first outer layer of reflective foil 2 is bound on one side to a layer of foam material 4 by an adhesive binding coating 3. A second inner layer of reflective foil 8 is also bound by an adhesive binding coating 7 to a second layer of foam material 6. Sandwiched between the first layer of foam material 4 and second layer of material 6 is mesh material preferably made of galvanized metal. The entire material is bound together by running it through a heat press or laminator at a sufficiently high temperature, normally 425° or higher, so that it adheres the material together as an integrated piece. The sides and ends of material can be taped to provide further structural integrity. Once the material is made it can be formed into various structures, such as the HVAC ducts shown in FIGS. 2, 3 and 4, as well as boxes and other items requiring insulation.

Figure 2:
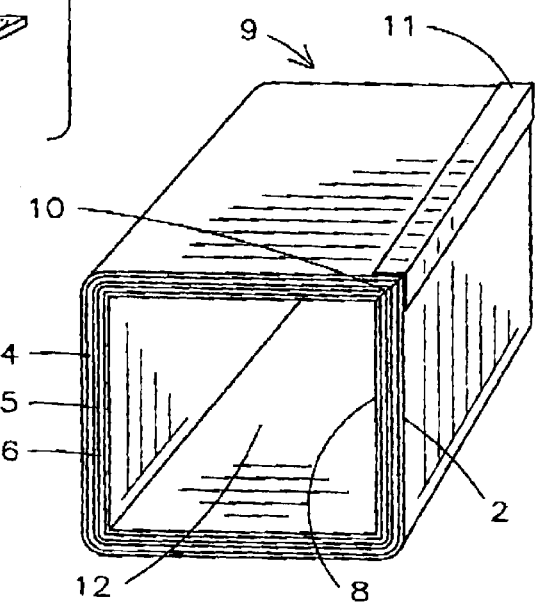
FIG. 2 is a perspective end view showing use of the invention to form a substantially rectangular air duct.

A substantially rectangular air duct is shown in FIG. 2. The material can be merely folded into such a configuration so the two ends meet at a juncture 10 which can be secured together by tape 11 or other means. In the latter manner, an air flow channel 12 is formed on the interior of the configuration.

Figure 3:
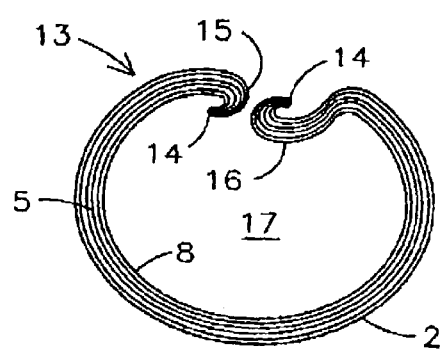
FIG. 3 is an end view of the material of the invention showing the configuration of a substantially circular air duct with unsecured curved hooks on each end.

Similarly the insulating material can be formed into a substantially circular air duct as shown in FIG. 3 to provide a circular air channel 17. Although the ends 14 of the material in the circular configuration could be taped together to provide better configuration, a more secure interconnection can be formed by providing an inward curved hook 15 at one end and an outward curved hook 16 at the other end.

Figure 4:
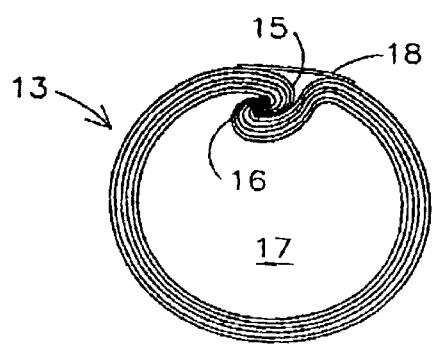
FIG. 4 is an end view of the air duct of FIG. 3 with the curved hooks on the ends interconnected and secured by tape.

As shown in FIG. 4, these curved ends 15 and 16 would be locked together so the configuration would reduce tendencies to unfold. A strip of tape 18 could be placed over the junction of the interconnected ends to further secure the material of the circular configuration and reduce possible air loss at the juncture of the ends.

Although any reflective foil 2 and 8 could be used to form the insulating material, preferably a metal foil having high reflective or heat radiant qualities, such as aluminum, is preferred. The adhesive binding coatings 3 and 7 would preferably be polyurethane. The foam material 4 and 6 would preferably be closed cell polyethylene foam. Finally, the mesh material 5, which provides the structural strength of the material in use, would preferably be made of galvanized steel or aluminum.

Although the structural reflective insulating material of the present invention has been described as being used for forming air ducts used in HVAC systems, it could be used to form almost any structural object for which insulating properties are desired, such as boxes, coolers, belly boards and other construction or non-construction applications requiring high structural integrity.

Although only a few embodiments of the present invention have been described in detail hereinabove, all improvements and modifications to this invention within the scope or equivalents of the claims are included as part of this invention.

I claim:

1. A structural reflective insulating material comprising:
   a first outer layer of reflective foil;
   an adhesive binding coating material on an inner side of said first outer layer of reflective foil;
   at least a first layer of foam material secured to said first layer of said reflective foil;
   at least one layer of wire mesh material sandwiched between at least said first layer of foam material and at least a second layer of foam material;
   at least a second layer of foam material;
   a coating or adhesive binding material between at least a second layer of foam material and at least a second inner layer of reflective foil; and
   at least a second layer of reflective foil bound to at least a second layer of foam material by the adhesive binding material;
   wherein the foam material is a closed cell foam;
   wherein the structural reflective insulating material is capable of being formed into ducts and other structural items.

2. The structural reflective insulating material of claim 1 wherein at least one of said first outer and second inner layers of reflective foil is aluminum.

3. The structural reflective insulating material of claim 2 wherein at least one of the first and second layers of foam material comprise polyethylene foam.

4. The structural reflective insulating material of claim 3 wherein the coating of adhesive binding material is polyurethane.

5. The structural reflective insulating material of claim 3 wherein the mesh material is one from a group consisting of aluminum and galvanized steel.

6. The structural reflective insulating material of claim 4 wherein the mesh material is one from a group consisting of aluminum and galvanized steel.

7. The structural reflective insulating material of claim 2 wherein the coating of adhesive binding material is polyurethane.

8. The structural reflective insulating material of claim 7 wherein the mesh material is one from a group consisting of aluminum and galvanized steel.

9. The structural reflective insulating material of claim 2 wherein the mesh material is one from a group consisting of aluminum and galvanized steel.

10. The structural reflective insulating material of claim 1 wherein at least one of the first and second layers of foam material comprise polyethylene foam.

11. The structural reflective insulating material of claim 10 wherein the coating of adhesive binding material is polyurethane.

12. The structural reflective insulating material of claim 10 wherein the mesh material is one from a group consisting of aluminum and galvanized steel.

13. The structural reflective insulating material of claim 11 wherein the mesh material is one from a group consisting of aluminum and galvanized steel.

14. The structural reflective insulating material of claim 1 wherein the coating of adhesive binding material is polyurethane.

15. The structural reflective insulating material of claim 14 wherein the mesh material is one from a group consisting of aluminum and galvanized steel.

16. The structural reflective insulating material of claim 1 wherein the mesh material is one from a group consisting of aluminum and galvanized steel.

17. A method of manufacturing a structural reflective insulating material capable of being formed into ducts and other structural items comprising the steps of:

coating a first layer of reflective foil on one side with an adhesive binding material;

placing a first layer of foam material against the coating;

laying a wire mesh material on the first layer of foam material;

placing a second layer of foam material over the mesh material;

coating a second layer of reflective foil on one side with an adhesive binding material;

placing the second layer of reflective foil with the side coated with an adhesive binding material against the second layer of foam material; and running the material through a heat press to bind all layers of material together to form an integral structural reflective insulating material;

wherein the foam material is a closed cell foam.

18. A method of making an air duct from a structural reflective insulating material capable of being formed into ducts and other structural items comprised of a first outer layer of reflective foil; an adhesive binding coating material on an inner side of said first outer layer of reflective foil; at least a first layer of foam material secured to said first layer of said reflective foil; at least one layer of wire mesh material sandwiched between at least said first layer of foam material and at least a second layer of foam material; at least a second layer of foam material; a coating or adhesive binding material between the at least a second layer of foam material and the at least a second inner layer of reflective foil; and the at least a second inner layer of reflective foil, comprising the steps of;

folding a piece of the structural reflective insulating material as many times as necessary so that ends of the piece form a channel; and securing the ends together by securing means to form a desired configuration;

wherein the foam material is a closed cell foam.

19. The method of forming the air duct in claim 18 wherein the securing means consists of metallic tape.

20. The method of forming the air duct in claim 18 wherein the desired configuration is substantially rectangular.

21. The method of forming the air duct in claim 18 wherein the desired configuration is substantially circular.

22. The method of forming the air duct of claim 21 wherein the securing means further comprises an inward curved hook on one end of the material and an outward curved hook on a second end, said curved hooks being interconnected to lock the duct in the substantially circular configuration.

* * * * *